Patented Oct. 21, 1924.

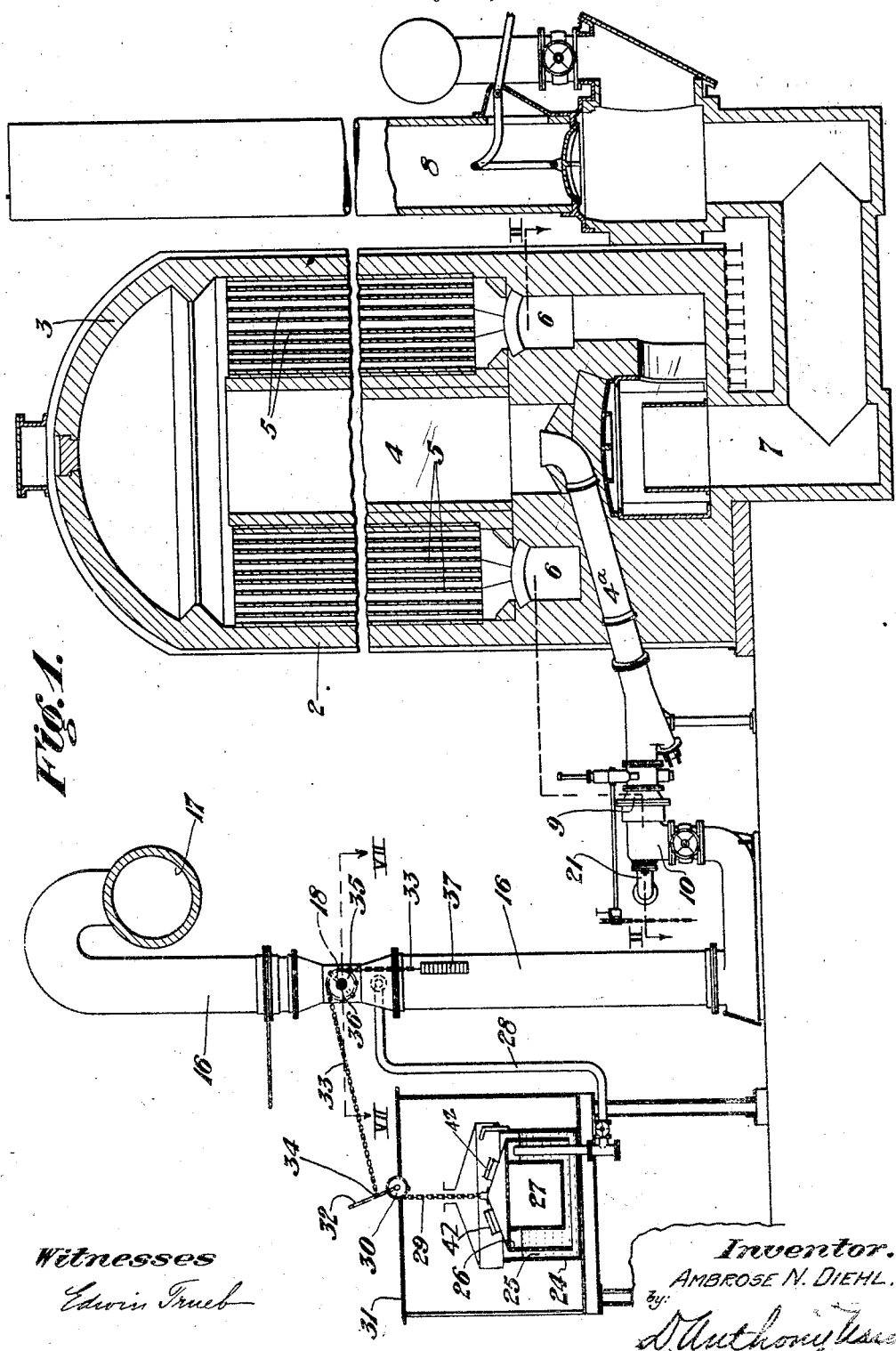

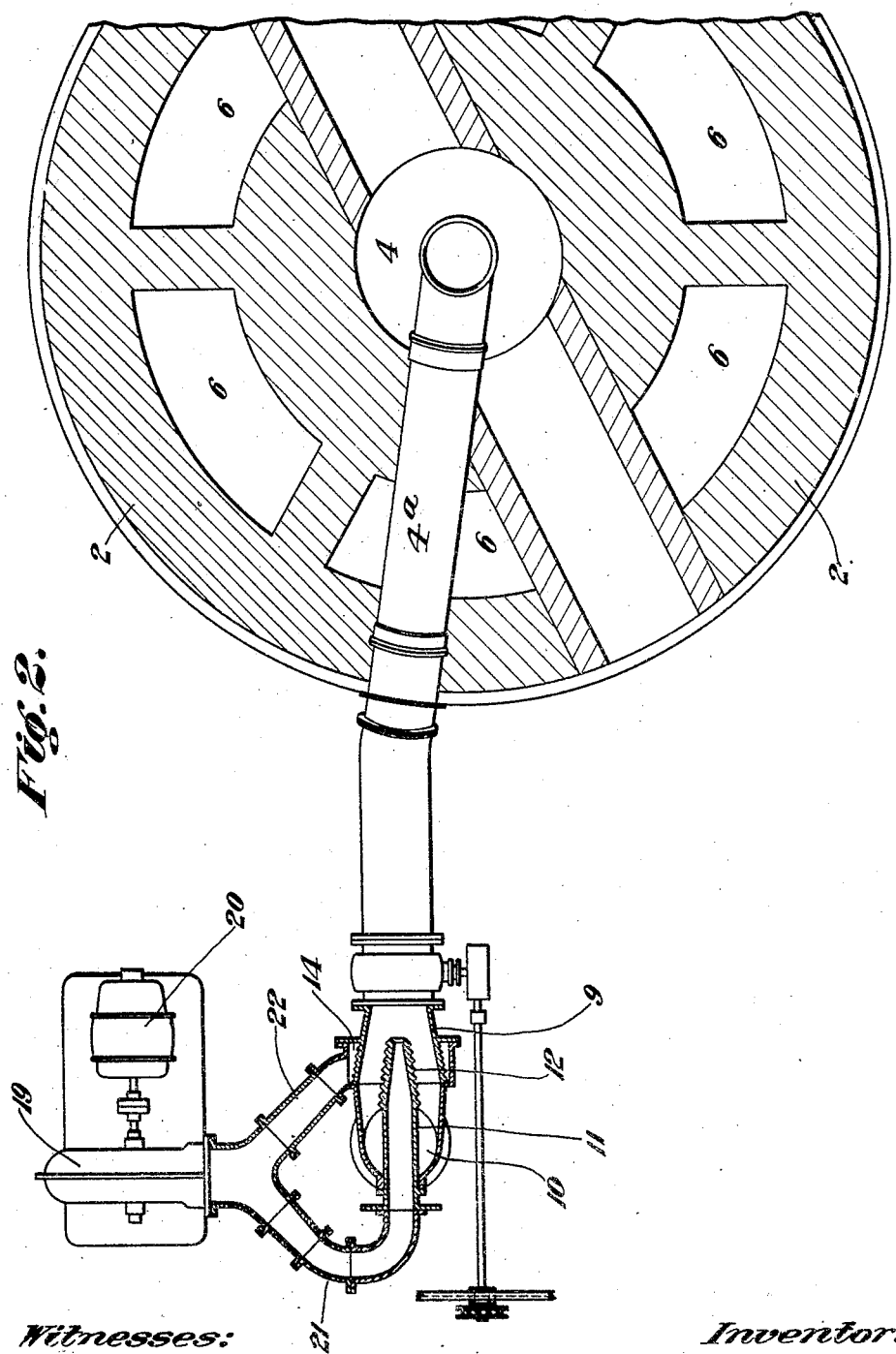

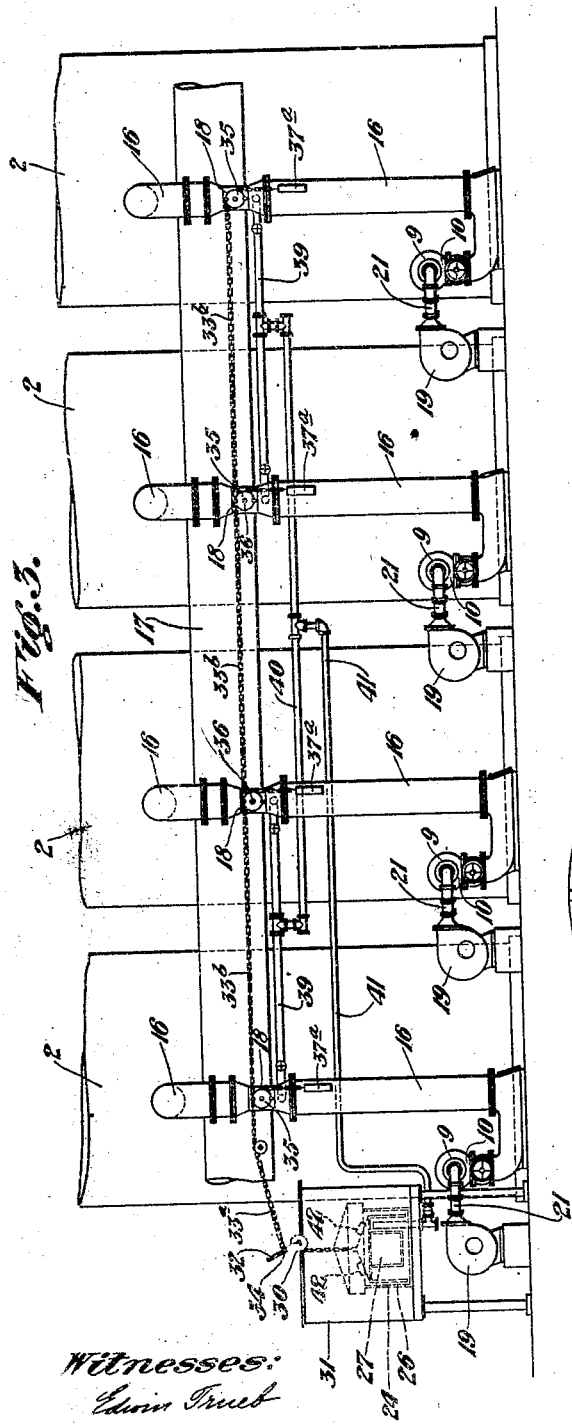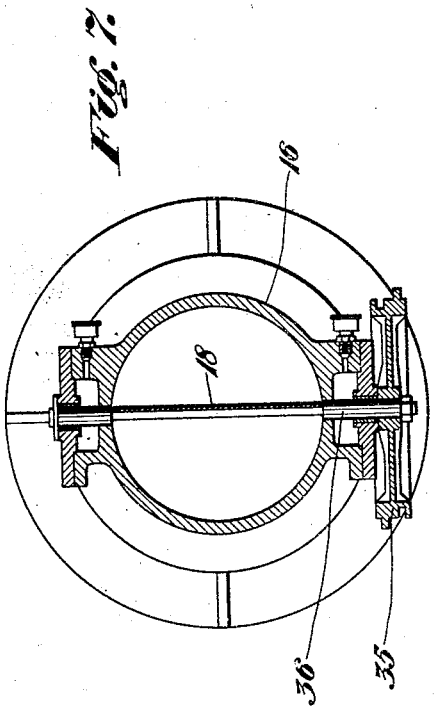

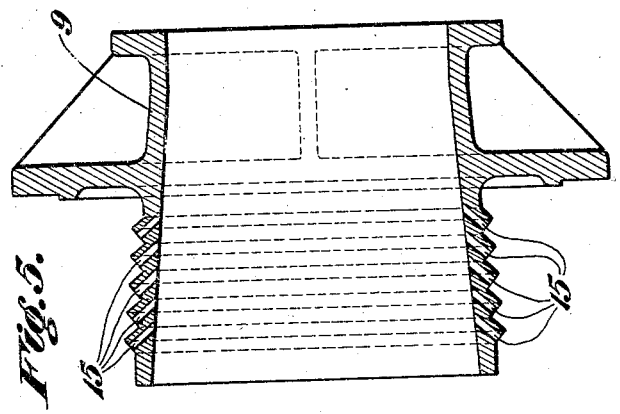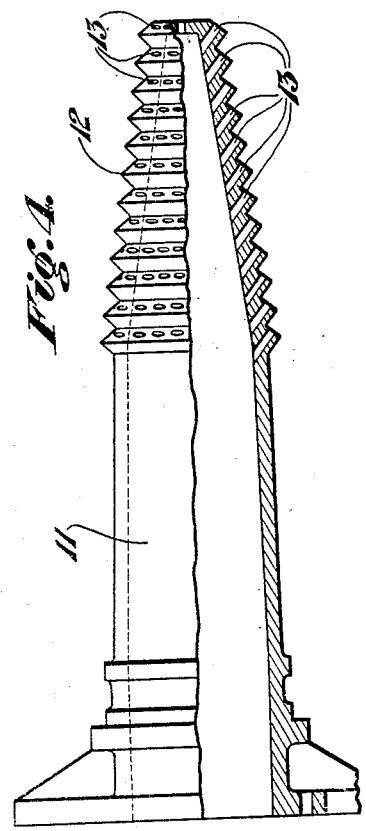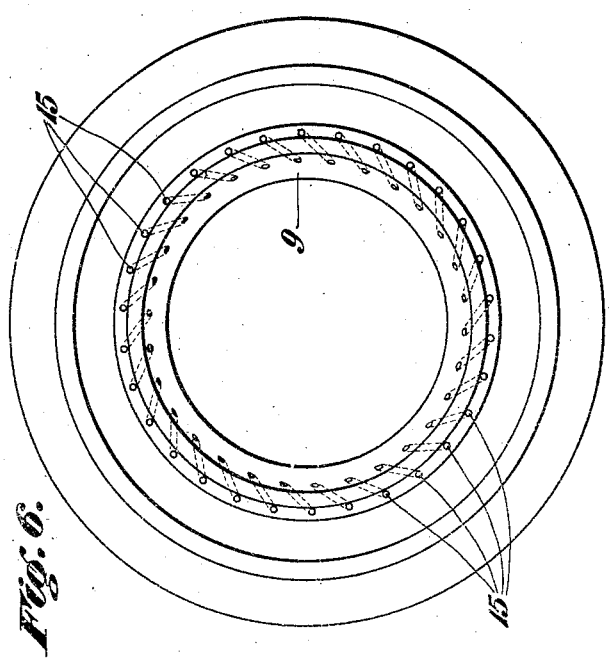

1,512,583

UNITED STATES PATENT OFFICE.

AMBROSE N. DIEHL, OF DUQUESNE, PENNSYLVANIA.

COMBUSTION SYSTEM FOR HOT-BLAST STOVES.

Application filed May 26, 1922. Serial No. 563,829.

*To all whom it may concern:*

Be it known that I, AMBROSE N. DIEHL, a citizen of the United States, and resident of Duquesne, in the county of Allegheny and State of Pennsylvania, have invented certain new and useful Improvements in Combustion Systems for Hot-Blast Stoves, of which the following is a specification.

This invention relates to hot blast stoves and has for one of its objects the provision of a heating system for hot blast stoves whereby the flow of gases to the stove will be automatically regulated so as to provide a substantially constant flow.

Another object of the invention is the provision of a system of this class in which the air supply is regulated and controlled so as to provide a substantially constant flow of air in sufficient volume to support combustion of the gases being supplied.

A further object of the invention is to provide a novel form of mixer whereby the gas and air will be thoroughly mixed before entering the stoves.

A still further object of the invention is to provide a system of this class that will automatically regulate a battery of stoves simultaneously.

Referring to the drawings illustrating the invention—

Figure 1 is a sectional elevation through a hot blast stove, having the invention applied thereto.

Figure 2 is a sectional plan on the line II—II of Figure 1.

Figure 3 is a side elevation of a battery of four stoves, having the invention applied thereto.

Figure 4 is an enlarged detail of the mixer nozzle partly in section.

Figure 5 is an enlarged detail of the forward section of the mixing chamber partly in section.

Figure 6 it a rear elevation of the forward section of the mixing chamber.

Figure 7 is a sectional plan through the gas supply conduit on the line VII—VII of Figure 1, showing the butterfly control valve.

The invention is shown applied to a two-pass stove of standard design comprising an outer cylindrical wall 2, a dome-shaped top 3, a central combustion chamber 4, and a surrounding checkerwork 5. The checkerwork opens at its lower end into suitable flues 6 which communicate with a stack flue 7 leading to the stack 8.

The stove is adapted to be fired with blast furnace gases and is, therefore, provided with a suitable mixer which comprises a hollow substantially cylindrical body portion 9 forming a mixing chamber having a gas inlet 10, a nozzle member 11 arranged centrally within the mixing chamber 9, and provided with a tapering forward end 12. The nozzle is provided with a series of circumferential rows of holes or apertures 13 forming outlets for the air and which extend forwardly on an angle of approximately 30 degrees to the axis of the nozzle and the mixing chamber. An annular air chamber 14 is arranged around the mixing chamber adjacent its forward end and is provided with inlet holes or apertures 15 which extend tangentially through the wall of the chamber 9 on forwardly extending angles of approximately 30 degrees to the axis of the chamber 9, so that the air entering through these apertures is given a forward centrifugal motion which is imparted to the column of gases flowing through the chamber and insures a thorough mixing of the air and gas. It will also be seen that the angular arrangement of the holes 13 and 15 in the nozzle 11 and in the mixing chamber 9, respectively, cause the air to flow across the line of flow of the gases and thus to more thoroughly mix therewith. The mixture of combustible gases and air is delivered through the tube or conduit 4ª into the lower end of the combustion chamber 4 and there ignites and is burned.

Gases are supplied to the mixer through the inlet 10 by a conduit 16 leading from a main 17 and provided with a suitable butterfly valve 18 intermediate its ends adapted to regulate the flow of gas therethrough.

A suitable blower 19 having a direct driving connection with a motor 20 is provided for supplying a substantially constant supply of air to the mixer through its nozzle 11 and air chamber 14. Suitable conduits 21 and 22 lead from the blower to the nozzle 11 and air chamber 14, respectively. The blower 19 is of a well known centrifugal type, the housing perimeter being in the form of a spiral, and the wheel or fan being of the backward curved type, having main floats or blades and intermediate floats or blades all curved backward or away from the direction of rotation. The blower 19, due to the backward curve of its blades and the spiral form of its perimeter, will give what is known as a flat pressure curve, wherein the difference in pressure between the calculated operating conditions and the pressure at any other air delivery point less than the calculated volume, is as near constant as possible. Therefore, if the pressure in the mixer rises to a certain predetermined amount, no air will be delivered by the blower 19, and consequently no air will be forced into the gas conduit at the mixer to create an explosion hazard.

The butterfly valve 18 is adapted to be automatically controlled by an incremental float type regulator comprising a container 24 having a quantity of oil or other fluid 25 therein and having a bell 26 floating in said fluid. The bell 26 has a hollow inner drum 27 of somewhat smaller diameter attached concentrically thereto. The drum 27 supplies the buoyant force necessary to overcome the weight of the bell. A pipe or branch conduit 28 leads from the conduit 16 at a point below the valve 18 to the regulator and extends up within the bell 26 to a point above the fluid level and supplies gas pressure under the bell.

The bell 26 is connected by a chain 29 to the circumference of a sheave wheel 30 mounted on a frame support 31 above the bell and provided with a radially extending arm 32. A chain 33 has one end connected by a radially adjustable connection 34 to the arm 32 and is connected intermediate its end to the circumference of a sheave wheel 35 on the butterfly valve shaft 36. The free end of the chain 33 is provided with a counter-weight 37 adapted to keep the chain taut so that any movement of the bell 26 will be communicated through chain 29, wheel 30, arm 32 and chain 33 to the sheave 35 and valve 18.

The purpose of the arm 32 is to provide adjustment in the motion of the regulator or bell transmitted to the butterfly valve 18 to compensate for the flow characteristics of the butterfly valve.

In Figure 3 a battery of four stoves is shown controlled by a single regulator. In this construction the air and gas is supplied to the mixer the same as when only one stove is controlled. However, in order to get the best results from the regulator it has been found advisable to have an average of the gas pressures in all the four gas supply conduits 16 operate the bell 26 of the regulator, and therefore the conduits 16 are connected in pairs by pipes 39 and these pipes are connected midway between their ends to a pipe 40, which in turn is connected midway between its ends to a pipe or conduit 41 which extends up within the regulator the same as the pipe 28.

The several butterfly valves in the battery of stoves are operated simultaneously by a series of chains, the first stove being operated by a chain 33$^a$ which is connected to the sheave 35 in the same manner as the chain 33 in the single construction. However, the valve 18 in the other three stoves are each operated by chains 33$^b$ connected to the next preceding valve sheave 35 and to their sheave 35, and each chain is provided with a counterweight 37$^a$ to keep it taut. By this construction it will be seen that the operation of the sheave 35 on the first stove will cause a simultaneous movement of the sheaves on each succeeding stove.

The operation of this system is as follows:

Assuming that the regulator and mixer are designed to operate at a pressure equal to, or slightly lower, than the minimum pressure ever attained in the gas supply main, as for example at one and one-half inches of water.

Due to the drum 27 which furnishes a buoyant force equal to the weight of the bell 26, and the counterweights 42 on top of the drum which exert a downward force equivalent to the normal operating pressure desired for the stove, the bell will assume a certain definite position. Assuming the bell at this initial position, any increase in pressure in the conduit 16 will be communicated to the underside of the bell 26 through the pipe 28 or 41, and the bell will rise, thus releasing the valve operating chains and gradually close the valves 18. The bell 26 will continue to rise until the valves 18 have throttled the conduits 16 sufficiently to reduce the pressure to a point where it will not be sufficient to raise the bell farther. At this point the bell will remain until some further increase or decrease in gas pressure tends to again cause it to rise or fall. It is evident that due to the change in the buoyant effect of the drum 27 as the bell rises or falls, the movement of the bell from the initial position, and consequently the variation in pressure in the conduit 16, will be much less violent and irregular than were the bell not equipped with the drum. The drum in addition to supplying the buoyant force necessary to balance the bell thus serves to give the regulator bell a definite position for any given pressure within it, and acts as a stabilizer on the movement of the bell 26 and the butterfly valve 18 to which the bell is connected, thus dampening the effect of the fluctuations in pressure in the supply main and in consequence giving a practically uniform pressure at the mixer.

It will thus be seen that by maintaining a substantially constant supply of gas and air, and by thoroughly mixing the two, as described above, a correctly proportioned and uniform mixture is assured over a wide range of gas volumes burned, resulting in a much higher stove efficiency than heretofore obtained.

I claim:—

1. A combustion system for hot blast stoves comprising a gas and air mixer, a conduit leading from said mixer into the combustion chamber of said stove, means for supplying a substantially constant supply of air under pressure to said mixer, a gas supply conduit for supplying gas to said mixer, a valve in said conduit, and means operable by the gas pressure in said conduit for operating said valve so as to cause a substantially constant flow of gas into said mixer.

2. A combustion system for hot blast stoves comprising a gas and air mixer, a conduit leading from said mixer into the combustion chamber of said stove, means for supplying a substantially constant supply of air under pressure to said mixer, a valve in said conduit, and a float operated incremental type regulator for operating said valve so as to cause a substantially constant flow of gas into said mixer, said regulator being operable by the gas pressure in said conduit below said valve.

3. A combustion system for hot blast stoves comprising a gas and air mixer, a conduit leading from said mixer into the combustion chamber of said stove, means for supplying a substantially constant supply of air under pressure to said mixer, a gas supply conduit for supplying gas to said mixer, a valve in said conduit, and a float operated incremental type regulator for operating said valve, a branch conduit leading from below the valve in said gas supply conduit to the float of said regulator so as to cause a substantially constant flow of gas into said mixer.

4. A combustion system for hot blast stoves comprising a gas and air mixer, a conduit leading from said mixer into the combustion chamber of said stove, a motor driven blower for supplying a substantially constant supply of air under pressure to said mixer, a gas supply conduit for supplying gas to said mixer, a butterfly valve in said conduit, a float operated incremental type regulator for operating said valve, a branch conduit leading from below the valve in said gas supply conduit to the float of said regulator adapted to supply gas to operate said regulator so as to cause a substantially constant flow of gas into said mixer.

5. A combustion system for a battery of hot blast stoves comprising a gas and air mixer for each of said stoves, conduits leading from said mixers into the combustion chambers of said stoves, means for supplying a substantially constant supply of air under pressure to said mixers, gas supply conduits for supplying gas to each of said mixers, a valve in each of said conduits for regulating the flow of gas to said mixers, a float operated incremental type regulator adapted to automatically operate said valves, and branch conduits leading from below the valves in said gas supply conduits to the float of said regulator and adapted to supply gas to operate said regulator so as to cause a substantially constant flow of gas into said mixers.

6. A combustion system for a battery of hot blast stoves comprising a gas and air mixer for each of said stoves, conduits leading from said mixers into the combustion chambers of said stoves, independent motor driven blowers for supplying a substantially constant supply of air under pressure to said mixers, independent gas supply conduits for supplying gas to each of said mixers, a butterfly valve in each of said conduits for regulating the flow of gas to said mixers, a float operated incremental type regulator adapted to operate all of said valves simultaneously and branch conduits leading from below the valves in said gas supply conduits to the float of said regulator and adapted to supply gas to operate said regulator so as to cause a substantially constant flow of gas into said mixers.

In testimony whereof, I have hereunto set my hand.

AMBROSE N. DIEHL.